…

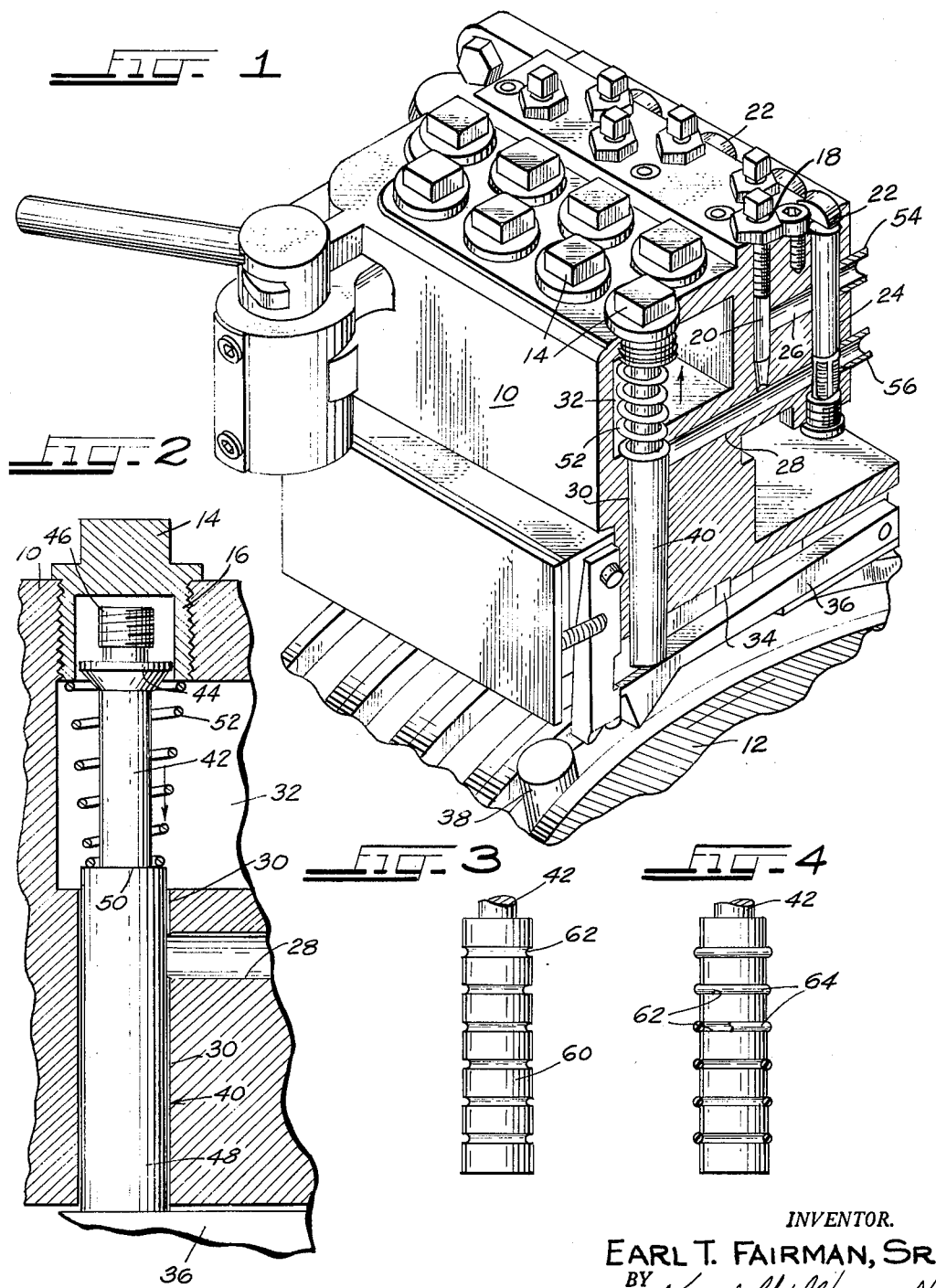

United States Patent Office 3,225,791
Patented Dec. 28, 1965

3,225,791
APPARATUS FOR FORMING HOLLOW
GLASS ARTICLES
Earl T. Fairman, Sr., 3825 W. Waco Drive, Waco, Tex.
Filed June 19, 1961, Ser. No. 126,413
7 Claims. (Cl. 137—624.18)

This invention relates to an improvement in the ordinary glass bottle making machine and particularly in the now well-known commercial type known as the "Hartford I.S. Machine" substantially disclosed in Ingle Patents Nos. 1,878,521 of September 20, 1932 and 1,911,119 of May 23, 1933, as well as in the G. E. Rowe Patents Nos. 2,142,954 and 2,142,955 of January 3, 1939 in which a number of valves are mounted in a valve block for controlling the operation of air as applied to various parts of the machine. These machines generally have a continuously rotating drum with adjustable contacts thereon for operating levers which control the operation of valves in the valve block by raising or lowering them for variable portions of time so that the valves remain open or remain closed for a predetermined portion of the rotation of the drum.

A gob of glass is originally fed by gravity into a mold and is thereafter fed downwardly by a settle-blowing action to make it conform more readily to the neck mold at the bottom of a bottle as shown in FIGS. 1 and 2 of either of the Rowe patents.

Thereupon in a downward blowing operation, the glass is compressed downwardly in the mold causing a weak spot and poor adherence of the glass in the neck and in the wall of the bottle continuing therefrom.

The present action is similar to that shown in the previous art of record except that in place of this settle-blow movement, a vacuum valve is installed at the bottom of the mold to draw the gob of glass downwardly into contact with the neck forming structure, thus minimizing, if not entirely eliminating the results of the settle-blow and substituting for it, the suction of a vacuum line as applied to the bottom or neck of a bottle, and therefore more quickly and more accurately drawing the glass downwardly and causing it to fill the neck portion of a bottle without weakening the contact of the neck portion with the side walls thereof, thereby resulting in a stronger bottle without this dangerous connection or break line, providing an efficient and homogenous structure between the neck itself and the adjoining wall of the bottle, preventing the forcing of additional glass from the gob downwardly into the neck of the bottle, and as a result thereof, causing a much quicker action so that bottles are formed more quickly and more accurately, the necks are drawn downwardly to fill the space more quickly, and a greater number of bottles may therefore be produced on the same I.S. machine by substituting a vacuum action which is to eliminate the settle-blow action.

In this way, two similar vacuum valves might be employed which are located in the same valve block as in the previous commercial types of machines and operating each one of them by means of a valve and a lever as ordinarily related to a rotary drum and repeating the action of a parison and the completion of a bottle as shown in the previous patents. The only necessary change in the existing structure is perhaps to increase the size of the vacuum valve employed and to place two valves in the bottom plate, one operating upwardly in the valve seat of the valve block, or in the counter-blow valve seat to seal off the vacuum escaping from the said plunger cylinder.

One of the principal objects of the invention is therefore to provide an improved apparatus for forming hollow glassware and to operate a well-known type of bottle making machine with vacuum valves wherein a plurality of sections of a machine are fed with mold charges from a single feeding source, each section comprising a pair of molds including an inverted blank mold and an upright blow mold or finishing mold.

A further important object of the invention is to provide means for reducing and eliminating settle-blow.

A further object of the invention is to cause a more even distribution of the glass and a better finish on the glass bottles;

A further object of the invention is to provide a means for making a much stronger bottle in a decreased time;

Still a further object of the invention is to improve the operation and construction of a vacuum operating valve controlled by the ordinary timing drum of a glass machine.

Other objects of the invention will appear in the specification and will be apparent from the accompanying drawings in which, FIG. 1 is a perspective view of a portion of a block of a well known I.S. glass bottle machine to which a valve in accordance with this invention is applied for carrying out the vacuum blow method;

FIG. 2 is a side and sectional view of a valve and its housing included in the construction of FIG. 1;

FIG. 3 is a perspective view of a modified form of valve; and FIG. 4 shows still another modified form of the valve.

In a well known type of glass bottle making machine in accordance with this invention, each pair of molds is mounted and operated independently of the other pair of molds, the blank bottle molds and the blow-bottle molds of each pair being received at a charge receiving station and a finish blowing station respectively and having an oscillating transfer device mounted between the molds of each pair to transfer parison or bottle blanks from the blank station to the finishing blowing station.

This is a statement of the well-known operation of a glass bottle making machine and the invention added is the substitution of the present type of vacuum valve in the heretofore well known method and procedure of making hollow bottles. The vacuum valve may be combined with the other valves, connections and operating means in carrying out the method of a well known type of I.S. machine to produce more rapid and improved results by permitting faster operation and more even distribution of glass in a glass bottle as described. The valve may be placed in a valve block either with the bottom plate up or with the bottom plate down. One valve may be placed in the counter-blow valve seat of a valve block in order to seal off vacuum escaping from the plunger cylinder.

A pipe connecting line to the bottom plate up or down may be discarded for the bottom plate up or down purposes, and a vacuum line from 3/8" to 5/8" may be used in place of the bottom up or down line to pull vacuum from the main vacuum line to the plunger cylinder, and this line will be connected with the counter-blow line that is attached to the plunger cylinder. This connection is to help eliminate the settle-blow operation.

This vacuum valve may be worked with an ordinary off-and-on stud from a timing drum in a proper or desired position. The counter-blow opening in the plunger cylinder may be drilled out from the present size to 5/8" for increasing the air or vacuum volume to the plunger or neck ring. In fact, one vacuum valve may be worked in a valve block for vacuum purposes, but better results are obtained by working two vacuum valves in each valve block, one for the vacuum and one for the counter-blow operation.

Referring now more particularly to the accompanying drawings, a portion of a valve block 10 is shown in FIG.

1 with an adjacent portion of a rotary drum 12 in position beneath it.

In the head of each block are a number of studs 14 each having a hollow sleeve 16 in which the head of a valve may be moved. Each study may be removed for adjustment and replacement of each valve and in the other portion of the block are other studs 18 threaded into an opening 20 and valves 22 adjustable in parallel openings 24, but the latter extending across a passage 26 and intersecting another passage in the block parallel thereto but leading to a valve opening 30 at right angles to the passage 28 and communicating with one of the studs through an open chamber 32.

The valve opening 30 is therefore at the bottom of the open chamber 32 and in line with one of the studs 14 and if it is thought to be too small for vacuum line purposes, it is preferably bored out from ⅜" to a larger diameter such as ⅝" to increase the air volume of the passage.

This chamber 32 leads through the opening 30 to a bottom or valve chamber 34 of the block in which a lever 36 is pivoted for raising and lowering movement by the engagement of its under side with an adjustable button 38 on the rotatable operating drum 12, the top of the free end of the lever 36 directly contacting the bottom end of a vacuum valve 40 in accordance with this invention.

Any vacuum existing in passages 26 and 28 is broken by establishing communication between the open chamber 32 and the passage 28 which also opens into the passage 28. The valve 40 is said to be in closed position when the inner end 50 of the valve closing portion 48 is seated tightly at the inner end of the valve opening 30. Longitudinal closing movement of the lever and of the valve is caused by the movement of the drum lever 36 which engages and moves it upwardly and this is opposed by the action of a spring 52 as hereafter described.

This vacuum valve 40 has a preferably integral valve stem 42 which is less in diameter than a guiding head 44 which is adapted to make a sliding fit in the interior of the hollow sleeve 16 of the stud 14. At the upper end and beyond the head 44 is a threaded extension 46 by means of which the valve may be engaged, removed or replaced by another tool threaded therein when the stud is removed, and the valve inserted in the valve opening 30.

At the other or bottom end of the valve is a valve closing portion 48 of substantial uniform diameter to fit closely and tightly in the valve opening 30. For practical purposes, the upper or inner end 50 of this valve closing portion 48 forms a shoulder for the stem 42 but may be slightly less in diameter than the extremity or head thereof in the nature of .001 inch for the purpose of lubricating and readily removing the valve from its seat or opening, but also for making a fluid or vacuum-tight joint with the valve opening 30 when the valve is closed.

The bottom or weighted valve closing portion 48 extends through the bottom of the block for direct contact with the free end of the lever 36 so that in its open position as shown in FIG. 1, the inner end of the valve closing portion 48 is seated loosely at the inner end of the valve opening 30, opening the connection between the open chamber 32 and the passage 28 around the valve. A spring 52 surrounds the stem 42 of the valve and is located in the chamber 32 which may therefore be termed "The Valve Chamber" and one end of this spring bears against the under side of the inner end of the hollow sleeve 16 while the other end engages the angular inner end 50, or shoulder projection on the valve formed by the valve closing portion 48, the spring tending to oppose the valve closing action of the lever 36 which is raised at a determined time by buttons 38 on the drum 12. The spring 52 therefore presses the valve closing portion 48 out of closing position and the lever 36 tends to raise and close this connection against the pressure of the spring when engaged by the button 38. After the lever passes the button 38, the valve is immediately opened by the spring tension, breaking any vacuum between the chamber 32 and the passage 28 through the upper end of the valve opening 30.

In the view shown in FIG. 2, communication is afforded in either direction around the inner end 50 of the valve closing portion 48 after the valve opening action of the spring 52 to admit air to the passage 28 or to break a vacuum previously established therein and tubular connections 54 and 56 are represented as extending from the passages 26 and 28 respectively for producing the desired effect by means of this vacuum valve.

Either of the tubular connections 54 or 56 extend directly or indirectly to a suitable source (not shown) of vacuum or suction for supplying negative pressure to the machine.

Instead of having a weighted or substantially uniform valve closing portion 48 as in FIG. 2, a valve closing portion 60 of substantially uniform diameter may be provided as shown in FIGURE 3 having a plurality of grooves 62 therein, each extending entirely around the valve closing portion at right angles thereto, being entirely separate and distinct and having no connection and forming no leakage surface with any of the other grooves.

A still further modification of the valve closing portion is shown in FIG. 4, in which the grooves 62 of the form shown in FIG. 3 are provided with split contact rings 64 seated therein, the rings being confined tightly in the valve opening in which the valve closing portion 60 is inserted and providing a further effective anti-leakage path about this end of a valve.

This principal construction and these modified constructions are thus adapted for use in the valve system of an I.S. bottle making machine, or any other similar device using a vacuum valve and vacuum devices. The vacuum valve may be larger or smaller and may be variously connected through the passages it controls with the various other operating portions of the machine.

At the time a charge of glass is supplied to a mold as in Rowe, or Ingle, counter-blowing pressure is ordinarily supplied moving the glass downwardly in the mold either due to its initial movement in passing or during the settling operation.

In the present action, this settle blowing movement is avoided and the glasss is drawn downwardly in the neck of a bottle mold due to suction or a vacuum pressure through the passage as 28 in the present case, and this action is quickly broken at the desired time by opening the valve and is determined by closing the valve. At this time, the parison is formed more smoothly and quickly by the vacuum action than by a counter-blowing action, the parison is more quickly cooled by the vacuum action and it is ready for movement of translation to the finishing mold position in which the blowing action is continued. This may result in the saving of only a few seconds in completing the surface and forming the continuous sides of the neck and the bottle, but it actually permits a speeding up action of the operating drum and therefore the consequent completion of more bottles per hour with a more uniform surface or coating, eliminating the settle-blow and eliminating the time of its operation and thereby consolidating and completing it in less time with another movement.

With this construction, the operation of glass bottle making machines may be speeded up and more bottles per hour may be obtained; the surfaces are stronger and more uniform and finished, and the method of preparing and inserting a vacuum valve is readily understood by those charged with the operation of these machines. It is necessary only to remove a proper stud 14 to remove the settle-blow valve heretofore employed; to enlarge the valve opening if desired and to insert a vacuum valve in accordance with the present invention.

The addition of the controlled passages from the vacuum valve to the other passages of the machine is likewise easily effected by making the proper pipe connections 54 and 56 and otherwise adjusting and varying the operation of the valves by means of the block 10 and the operating rotary drum 12.

While I have thus described the method and apparatus for forming glass articles by substituting a vacuum valve in one or more places in a glass-making machine, and for properly connecting the passages to other operating devices in the machine in some detail, they should be regarded as illustrations or examples rather than limitations or restrictions of the invention since various changes in the method and in the construction, combination and arrangement of the parts may be made without departing from the spirit and scope of the invention.

I claim:

1. Apparatus for forming a hollow glass article comprising a body mold and a vacuum valve in connection with the mold in which the valve has a valve closing portion substantially of the same diameter extending throughout more than half of the length of the valve, a reduced stem connected to one end thereof and a guiding head at the other end of the stem, the mold having an open chamber through which the stem of the valve passes, a stud in the top of the chamber with a depending sleeve into which the said head extends with the valve passage opening at the bottom of the chamber in line with the stud sleeve to guide the valve and with the passage near the chamber extending into the valve passage and closed by said valve closing portion when the valve is raised.

2. A valve structure in accordance with claim 1 in which a reduced stem has a larger guide head adjacent one end thereof, a valve closing portion at the other end of the stem as large as the head and substantially of uniform diameter but tapering slightly inward toward the stem, and means forming a valve seat for the said closing portion of the stem extending tightly around the valve closing portion to make a fluid tight fit with said valve seat but allowing a lengthwise sliding movement thereof.

3. Valve apparatus for a bottle making machine comprising a valve block with stud and valve openings therein from a common chamber and in alignment with each other, an operating drum with adjustable projection pieces extending therefrom and located adjacent to the block, the valve openings extending at right angles to the drum and other passages leading from said valve passage, a valve operating lever mounted on the block and having a free end to engage and moved by a projection on the drum, a valve longitudinally moved mounted in the openings and directly engaging the free end of the lever, a hollow stud for one end of the valve, the valve having a guiding stem having projections of which one extends in the opening in the block and the other end extends into the hollow stud, spring means engaging the valve projection and the stud and tending to press the valve from its seat and against the end of said lever which engages it.

4. A vacuum valve for glass making machines, comprising a stem having a circular guide projecting near one end, and a valve closing projection on the other end of the stem having a substantially continuous enlarged portion, the enlarged portion extending about half the length of the valve and being graduated from its outer end inwardly so that the inner end is of the nature of .001 inch less in diameter than the outer end of said portion.

5. A vacuum valve in accordance with claim 3, in which the substantially uniform valve closing portion is formed with a number of independent oil grooves separated from each other.

6. A vacuum valve in accordance with claim 3 comprising a plurality of substantially uniform independent grooves separated from each other and a split ring for each groove adapted to be seated therein and to extend slightly outward therefrom to provide a lubrication take up in a valve seat to which the valve is applied tending to make it airtight.

7. A vacuum valve for a glass making machine in accordance with claim 2 in which the valve has a threaded outside portion at the end which projects into the hollow stud for adjustment, removal and replacement purposes when the stud is bodily removed from the block.

References Cited by the Examiner
UNITED STATES PATENTS

| | | | |
|---|---|---|---|
| 2,010,774 | 8/1935 | Canfield | 65—219 |
| 2,038,808 | 4/1936 | Soubier | 65—219 |
| 2,049,422 | 8/1936 | Bridges | 65—234 X |
| 2,329,136 | 9/1943 | Poglein | 65—80 |
| 2,376,602 | 5/1945 | Kinker | 65—234 |
| 2,866,615 | 12/1958 | Hoesch | 251—229 |
| 2,892,611 | 6/1959 | Birkmaier | 251—229 |
| 2,987,854 | 6/1961 | Payner | 65—80 |
| 3,015,189 | 1/1962 | Allen | 65—234 X |

DONALL H. SYLVESTER, *Primary Examiner.*